United States Patent
Soane et al.

(10) Patent No.: US 6,743,830 B2
(45) Date of Patent: Jun. 1, 2004

(54) CONSTRUCTION BOARD MATERIALS WITH ENGINEERED MICROSTRUCTURES

(75) Inventors: David S. Soane, Piedmont, CA (US); Christopher D. Tagge, San Carlos, CA (US); Jacob Freas Pollock, Berkeley, CA (US)

(73) Assignee: Innovative Construction and Building Materials, Emeryville, CA (US)

(*) Notice: Subject to any disclaimer, the term of this patent is extended or adjusted under 35 U.S.C. 154(b) by 103 days.

(21) Appl. No.: 10/094,572

(22) Filed: Mar. 7, 2002

(65) Prior Publication Data

US 2002/0128352 A1 Sep. 12, 2002

Related U.S. Application Data

(60) Provisional application No. 60/273,925, filed on Mar. 7, 2001.

(51) Int. Cl.$^7$ ................................................. C08J 9/06
(52) U.S. Cl. .................... 521/83; 521/57; 521/76; 521/89; 523/219; 523/205; 523/211; 524/2; 524/3; 106/638
(58) Field of Search ..................... 521/59, 83, 76, 521/89; 523/205, 211, 219; 524/2, 3; 106/638; 428/304.4, 70, 71

(56) References Cited

U.S. PATENT DOCUMENTS

| | | |
|---|---|---|
| 3,878,278 A | 4/1975 | Miller et al. |
| 3,989,534 A | 11/1976 | Plunguian et al. |
| 4,137,198 A | 1/1979 | Sachs |
| 4,148,781 A | 4/1979 | Narukawa et al. |
| 4,153,470 A | 5/1979 | Stahl et al. |
| 4,265,964 A | 5/1981 | Burkhart |
| 4,330,589 A | 5/1982 | Saito et al. |
| 4,487,864 A | 12/1984 | Bermudez et al. ............. 524/2 |
| 4,518,652 A | 5/1985 | Willoughby |
| 4,778,529 A | 10/1988 | Barker et al. ................. 106/93 |
| 4,808,360 A | 2/1989 | Natori et al. ................ 264/221 |
| 4,845,207 A | 7/1989 | t'Sas .......................... 536/91 |
| 4,902,348 A | 2/1990 | Kossatz et al. |
| 4,923,538 A | 5/1990 | Hill |
| 4,949,518 A | 8/1990 | Nagel et al. |
| 4,994,113 A | 2/1991 | Helmstetter ................. 106/618 |
| 5,109,030 A | 4/1992 | Chao et al. |
| 5,194,091 A | 3/1993 | Laney ......................... 106/611 |
| 5,344,490 A | 9/1994 | Roosen et al. |
| 5,385,607 A | 1/1995 | Kiesewetter et al. ..... 106/197.1 |
| 5,387,626 A | 2/1995 | Böhme-Kovac et al. ...... 524/35 |
| 5,401,798 A | 3/1995 | Rasp et al. |
| 5,414,970 A | 5/1995 | Bontrager et al. |
| 5,432,215 A | 7/1995 | Girg et al. ..................... 524/28 |
| 5,482,551 A | 1/1996 | Morris et al. ................ 106/772 |
| 5,590,501 A | 1/1997 | Stoddart et al. |
| 5,641,584 A | 6/1997 | Andersen et al. |
| 5,658,656 A | 8/1997 | Whitney et al. |
| 5,765,334 A | 6/1998 | Vitous |
| 5,817,262 A | 10/1998 | Englert |
| 5,879,486 A | 3/1999 | Philips et al. |
| 5,879,825 A | 3/1999 | Burke et al. |
| 5,888,322 A | 3/1999 | Holland |
| 5,888,642 A | 3/1999 | Meteer et al. |
| 5,945,208 A | 8/1999 | Richards et al. |
| 6,042,665 A | 3/2000 | Kiraly et al. |
| 6,162,839 A | 12/2000 | Klauck et al. ................. 521/83 |
| 6,171,388 B1 | 1/2001 | Jobbins |
| 6,251,979 B1 | 6/2001 | Luongo |
| 6,319,312 B1 | 11/2001 | Luongo |
| 6,402,832 B1 | 6/2002 | Vijayendran et al. ........ 106/778 |
| 6,406,779 B1 | 6/2002 | Carbo et al. ................. 428/219 |
| 6,485,821 B1 | 11/2002 | Bruce et al. ............. 428/304.4 |
| 6,492,450 B1 | 12/2002 | Hsu ........................... 524/423 |
| 2002/0045684 A1 | 4/2002 | Bacher et al. .................. 524/4 |

FOREIGN PATENT DOCUMENTS

| | | |
|---|---|---|
| DE | 3920025 | 1/1991 |
| EP | 0 216 297 | 4/1987 |
| EP | 0 486 467 | 5/1992 |
| EP | 0 985 504 | 3/2000 |
| GB | 2 022 503 | 12/1979 |
| GB | 2 048 235 | 12/1980 |
| JP | 49-111928 | 10/1974 |
| JP | H 02-267148 | 10/1990 |
| JP | H 03-028181 | 2/1991 |
| WO | WO 99/54265 | 10/1990 |
| WO | WO 98/30515 | 7/1998 |
| WO | WO 00/76937 | 12/2000 |
| WO | WO 01/34534 | 5/2001 |
| WO | WO 02/48254 | 6/2002 |
| WO | WO 02/083594 | 10/2002 |
| WO | WO 03/012218 | 2/2003 |

OTHER PUBLICATIONS

F. Hayashi, et al., "Polyurethane–Gypsum Foams", *Int. Prog. Urethanes*, 3 (1981) pp. 113–133.
ASTM Standard Designation: C 473—95, pp. 249–259 (1995).
ASTM Standard Designation: C 36—95b, pp. 47–49 (1995).
ASTM Standard Designation: D3876—96, pp. 1–3 (2001).
The Dow Chemical Company, "Methocel Cellulose Ethers—Helping to Create Better Building Materials" (Oct. 1999).

(List continued on next page.)

*Primary Examiner*—Morton Foelak
(74) *Attorney, Agent, or Firm*—Ostrolenk, Faber, Gerb & Soffen, LLP

(57) ABSTRACT

The present invention discloses a composition of matter for use in wallboard in the construction that has a morphology of pores and a network of interconnected inorganic particles that are coated with a thin layer of organic binder. The process used to produce the wallboard can use either hydrophobic or hydrophilic prepolymers or preferably both to create the desired network of coated inorganic particles. A preferred embodiment uses at least one hydrophobic constituent and a decomposition reaction that produces a gas to form one or more layers or a gradient of the morphology in one or more layers to create wallboard products with superior properties to those wallboard products now known.

7 Claims, 1 Drawing Sheet

OTHER PUBLICATIONS

The Dow Chemical Company, "Methocel Cellulose Ethers-For Crack Fillers and Tape–Joint Compounds" (Aug. 1999).

The Dow Chemical Company, Methocel Cellulose Ethers—For Cement–Based Plaster (Dec. 2000).

F. Brandt et al., "Bassanite ($CaSO_4 \cdot 0.5H_2O$) Dissolution and Gypsum ($CaSO_4 \cdot 2H_2O$) Precipitation in the Presence of Cellulose Ethers," Journal of Crystal Growth 233:837–845 (2001).

U. Ludwig et al., "Effect of Temperature and Methyl Cellulose on the Hydration of Gipsum β–Hemihydrate," Il Cemento, vol. 1, pp. 39–50 (1979).

S–I. Takahashi et al., "Relationship between Distribution of Substituents and Water Solubility of O–Methyl Cellulose," Journal of Polymer Science: Part A: Polymer Chemistry, 25:987–994 (1987).

The Dow Company, "Methocel Cellulose Ethers for Gypsum–Based Building Materials—The final touch for building materials" (Aug. 1999).

T. Michelsen, "Building Materials (Survey)," Encyclopedia of Chemical Technology, 4th Edition, pp. 618–619 (1992).

CONSTRUCTION BOARD MATERIALS WITH ENGINEERED MICROSTRUCTURES

RELATED APPLICATIONS

This application claims the benefit of U.S. Provisional Application Serial No. 60,273,925, to David Soane, entitled "Construction Board Materials with Engineered Microstructures," filed Mar. 7, 2001.

BACKGROUND OF THE INVENTION

Current construction practice for interior and some exterior (such as soffits) surfaces relies primarily on gypsum board (drywall). Gypsum is a mineral found in nature as calcium sulfate dihydrate. Crushed and ground powder of calcined gypsum (calcium sulfate hemihydrate) is mixed with water and additives to form a slurry. This slurry is fed between two layers of paper and allowed to dry/harden, to make conventional gypsum boards. This simplistic system has served the construction industry for decades. However, it suffers several disadvantages that the present invention addresses. First, noise reduction performance is poor. A typical gypsum wall shows an NRC (noise reduction coefficient) in the range of 0.01 to 0.04. In contrast, acoustical tiles have an NRC on the order of 0.45 to 0.85. Second, standard gypsum boards exhibit poor thermal insulation. A ½-inch board has a heat transfer resistance (in metric units) of 0.45. In contrast, a 1-inch fiberglass insulation of polystyrene foam shows a resistance number on the order of 4. Further, gypsum boards are heavy. Finally, when scribed and broken, loose powders create mess and potential health hazards.

SUMMARY OF THE INVENTION

This application discloses a class of materials for making wallboards and other related elements for residential and commercial construction. More particularly, the present invention discloses a systematic method of microstructure engineering, designed to create construction materials of controlled morphology and superior sound isolation and thermal insulation properties. A key and distinguishing feature of such materials is that they possess specially engineered microstructures comprising both inorganic and organic components. Another main characteristic is controlled morphology, ensuring microscopic voids dispersed throughout the system. Resilient polymeric binders with viscoelastic damping properties cover microscopic inorganic particles, forming a crosslinked, percolating network. The inorganic kernels of the coated particles provide mechanical and dimensional stability as well as fire/flame retardancy. The viscoelastic polymer network contributes cohesion and sound attenuation. Finally, the air phase may form either a co-continuous, tortuous phase, intertwining the particular network throughout the system, or simply exist as a collection of dispersed voids. In either case, thermal insulation afforded by this new board structure is greatly enhanced. In addition, the numerous interfaces created by blending the inorganic and organic components in contact with the void phase result in impedance mismatch of vibration transmission and a large number of destructive interferences of transmitted/reflected waves; both phenomena cause sound attenuation. Therefore, this approach to controlled microstructural engineering for construction materials yields improved acoustical properties over conventional wallboards. The novel construction materials disclosed herein exhibit significantly lower density than conventional materials, facilitating their installation. A consequence of the heterogeneous, textured morphology is the lowered density and weight savings. Yet another desired outcome is the improved workability of the resulting wallboards. Finally, the engineered materials may be filled between any two surfaces, such as wood veneers, to make lightweight doors. Alternatively, when overcoated with a scratch-resistant surface layer, lightweight countertops can be made.

DETAILED DESCRIPTION OF INVENTION

Figure 1:
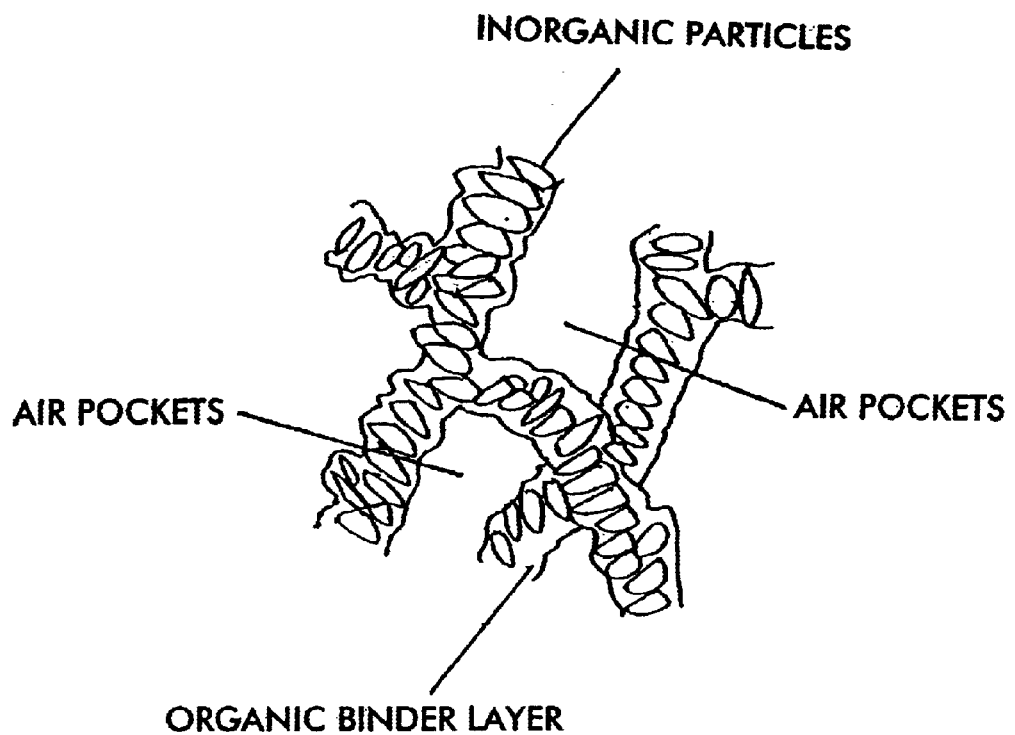
FIG. 1 shows a cross sectional schematic of a magnified region of the core.

This invention is best described by first dissecting the overall structure of the system, which is a complex core bonded to either two identical or two dissimilar surfaces. We will describe the core material and its manufacturing process, and then describe candidate surface treatments.

FIG. 1 shows a cross sectional schematic of a magnified region of the core. The core has a highly textured morphology, characterized by a significant pore volume, which can range between 2% to 98%, but preferably between 20% and 80%. The pores can be contiguous, forming curvilinear, branched, articulated and interconnected networks, or discontinuous and dispersed. The technical terms are open and closed cellular structures, respectively. Typical dimensions (width or diameter) of the pores are in the range of micrometers (microns), depending on the method of production. Most prevalent pore sizes range between hundreds of nanometers to tens of microns. The walls of the pores in this invention comprise both inorganic filler particles (aggregates or fused) and organic binders (polymers). The polymers overcoat the filler particles, providing adhesion between the particles and cohesion (thus mechanical/dimensional stability) of the overall core composite. In addition to bridging the particles, the polymeric binder offers viscoelastic damping (thus acoustic energy absorption), leading to superior noise reduction. The overall system is lightweight and possesses fire/flame retardancy similar to conventional gypsum boards. Furthermore, the high insulation efficiency afforded by the large void fraction protects the framing structure (2"×4" studs) from becoming overheated in the event of an actual fire. Below we describe the individual components in detail before presenting exemplary manufacturing processes.

The inorganic particles may be spherical or irregular in shape. They may be elongated such as short fibers or disc-like such as flakes. They may be monodisperse or polydisperse in size distribution. They may be mixtures (both in terms of composition of matter or average size). Bimodal size distribution may be optimal in space filling, due to the improved efficiency of packing. The small particles tend to reside in the interstitial region among large particles. Many inorganic materials are candidate fillers, including (but not limited to) calcined gypsum, sand, clay, glass, chopped fibers, mineral wool, pulverized materials (such as Portland cement, i.e., lime, iron oxide, silica, and alumina), chalk, bauxite, mortar, mica, and masonry ingredients, to name a few. Gypsum and cement mixtures are particularly useful, as they harden by hydration, thus depleting the concomitant water used in the dispersion/emulsion to facilitate flow.

The organic binders can be chosen from a large array of polymers or polymer-forming materials. The binders themselves may be mixtures of several or more ingredients. Systems ranging from naturally occurring materials such as bitumens and asphalts to synthetic thermoplastic and thermosets can be used. Acrylonitrile-Butadiene-Styrene (ABS), acrylics, methacrylics, cellulosics, nylons, polycarbonates, polyolefins, vinyls, styrenics, epoxies, formaldehydes (phenol-formaldehyde, melamine-formaldehyde, urea-formaldehyde, e.g.), polyesters, polyurethanes, and silicones are mere examples. The polymers may be pre-polymerized before mixing all the components of the composite, or polymerized in situ to form a crosslinked molecular network. The pre-polymerized version may have any architecture, i.e., linear, branched, star-shaped, or comb-shaped. They may be random or block copolymers. Block and graft copolymers provide ample opportunities for engineering surface affinity, while leaving the central spine (block) with the requisite viscoelasticity. For systems entailing in situ polymerization to form a crosslinked network in order to anchor the entrapped filler particles, the formulation may contain monomers, crosslinkers, oligomers and even preexisting dead polymers, for example. The inventors use the term prepolymers here to include all of the precursors that can be used for in situ polymerization. A monomer or combination of different monomers or incomplete chains of monomers or oligomers could also be used. The object is to create a process that causes the final organic binder to coat the inorganic particles, while simultaneously controlling the morphology of the voids formed during the hydration, crystallization, polymerization, and any optional expansion processes. Here the inventors differentiate the forming of voids during rehydration or by the addition of a stable foam, such as a surfactant stabilized aqueous foam from a process that expands a liquid composition by the evolution of gas, such as by a blowing agent or decomposition reaction. All of these methods of introducing pores into the wallboard are within the scope of the present invention, which does not depend on the source of the voids, but rather utilizes the hydrophobic and hydrophilic moieties of the prepolymers.

One specific embodiment of the invention is a composition of matter for use in wallboard that comprises an organic binder, which is polymerized in situ in a crosslinked molecular network during a polymerization reaction. For example, the polymerization reaction may comprise a polymer forming material that contains hydrophobic moities, which coats a plurality of inorganic particles, such as gypsum particles. In one alternative embodiment of the invention, the polymerization reaction produces an expansion by decomposition of at least one polymer forming material, which may be either different or the same as the polymer forming material that is hydrophobic. The expansion is caused by evolution of a gas during the decomposition reaction, for example carbon dioxide. Other alternative embodiments exist wherein a separate blowing agent is used to expand the composition of matter either in addition to the decomposition reaction or instead of the decomposition reaction. The result of the expansion of the composition of matter is that voids form within a network of the coated inorganic particles that are bound together by the organic binder. The morphology of the pores and the morphology of the network of organic-binder-coated inorganic particles is controlled by the hydrophobic and hydrophillic properties of the polymer forming materials and additives, as well as the reaction kinetics of decomposition, blowing agent and hydration, and specific embodiments of the invention create different pore and network morphologies. In an alternative embodiment, soap foam produced from vigorous mixing of a aqueous surfactant soulution is added to the gypsum/polymer slurry to introduce porosity to the embodiment in place of or in addition to blowing agents and gas evolution by decomposition.

Some preferred organic binders are epoxies, polyketones/diamines, polyurethanes, poly(sodium styrene sulfonate), and poly(maleic anhydride alt-1-octadecene)/diamine, which have shown exceptional strength to weight ratios, while improving the insulation value of the wallboard.

Referring to FIG. 1, the finished core composite has a percolation network of coated inorganic particles interpenetrated by voids. Since multiple interfaces exist in the core, sound attenuation is effective as a result of interface mismatch of propagation impedance and numerous destructive interferences of vibrational waves. In addition, a minimum of thermal conduction pathways is allowed. Convection is similarly hindered, giving rise to high insulation efficiency. Finally, the overall density of the core is significantly lower than that of a solid matrix found in conventional gypsum boards.

To produce such engineered microstructures, the above-described ingredients are mixed together. In a preferred embodiment, two additional components are added to enable formation of the desired morphology: emulsifiers (surfactants) and expanding agents (propellants). Emulsifiers or surfactants are amphiphilic compounds possessing both hydrophilic and hydrophobic moieties. Examples include Span, Tween, AOT, and WetAid, lower molecular weight polyvinylalcohol, and block copolymers, etc. Their selection is partially based on empiricism and partially based on guidelines known as the hydrophilic-lipophilic balance (HLB) method. The emulsifier/surfactant system stabilizes the complex and heterogeneous mixture, giving either oil-in-water or water-in-oil dispersions. Note that the solid particulates may be present in either phase or both. Upon drying (with simultaneous rehydration of certain particulates such as calcined gypsum, lime or cement), the composite is left with only the particulates coated with the organic binders (oil phase), while the volume formerly occupied by water is replaced by voids.

In this embodiment, a second key component added into the overall formulation is known as expanding or blowing agents. They are also referred to as propellants, as they propel the expansion of voids leading to a cellular microstructures. Propellants can be either physical or chemical blowing agents. Physical agents form cells by a phase change, such as volatilization of a liquid or desorption of a gas initially dissolved in either the aqueous or organic phase under high pressure. Chemical agents produce expansion by decomposition. Notable physical agents include pentane, isopentane, cyclopentane, hexane isomers, cyclohexane, and heptane isomers. Example chemical agents include sodium bicarbonate, dinitrosopentamethylenetetramine, sulfonyl hydrazides, azodicarbonaride. p-toluenesulfonyl semicarbazide, 5-phenyltetrazole, diisopropylhydrazodicarboxylate, 5-phenyl-3,6-dihydro-1,3,4-oxadiazin-2-one, and sodium borohydride.

Upon heating, physical agents volatilize and chemical agents decompose, resulting in bubble initiation and growth. The cellular structure continues to evolve until the increasing composite viscosity slows the system flow and the expanding pressure diminishes as the agents are spent. The overall system in the expanded state may have open or closed cellular microstructures, depending on the relative amount of agents added to the formulation, state of dispersion, interface properties of all the ingredients, rate of water and/or volatile organic solvent removal, time and composition-dependant viscosities of the phases, particle size and distribution. Closed-cell structure can be ensured by employing, in lieu of physical or chemical blowing agents, expandable microspheres (e.g., Expancel) that dissolve in either the aqueous or organic phase.

In one embodiment of the invention, a dense layer can be created by controlling the drying, polymerization, mixing and blowing steps. For example, a dense surface layer can be created by precoating the facing and/or backing surface with a skim layer of gypsum/polymer slurry which contains little or no foam or gas evolving materials. A second layer, which may contain foam or gas evolving materials to expand the core of the wallboard, can then be poured onto the skim layer to create a wallboard with a porous core and a dense surface layer. The object of this process is to increase the strength, insulation value, and sound absorption quality of the wallboard. In this embodiment, a polymerization reaction that avoids the evolution of gas is preferred for the preparation of the dense layer. In another embodiment, the facing and/or backing surface can be coated with a defoaming agent, which when contacting a foamed gypsum/polymer slurry, bursts gas bubbles at the surface to create a composite with a porous core and a dense surface layer. Other embodiments that do not require a dense layer can benefit from a polymerization, for example, by a reaction that creates gas during decomposition of reactant involved in an in situ polymerization process.

In one specific embodiment of the invention the surface of the wallboard product has a different composition than the core of the wallboard product. For example, the concentration of organic binder in the wallboard can have a gradient from the surface of the wallboard to the center of the core. Alternatively, the gradient in concentration can be from the surface to a point within the core other than the center, and then the remaining portion of the core can be at a constant concentration of organic binder. In yet another alternative, there can be a gradient in the morphology of the pores and/or fraction of porosity. In yet another alternative, both the concentration of organic binder and the morphology of the pores and/or the porosity can have a gradient. In another alternative embodiment, the wallboard product can be stratified with layers having varying percentages of polymer and/or differing types of polymers and/or differing morphology of the pores and/or porosity. The specific choice of wallboard structure can be prepared by continuous processing in steps or the gradations and stratifications can be made during a single process. For example, temperature variations during processing can cause changes in pore morphology and/or fraction of porosity. Also, mechanical shearing and compression can cause changes in density and concentration of organic binder near the surface. Alternatively, extrusion techniques known in the art can be used to achieve a gradation or stratification in the wallboard product. In another alternative, coatings can be applied to a preformed core, producing a striated wallboard product. The choice of processing technique is primarily one of economics, but there are also advantages in mechanical properties among the wallboard products produced by these various methods of fabrication. For example, a wallboard having a comparatively dense surface layer can be made during processing of the wallboard by application of a comparatively dense skim layer of gypsum/polymer slurry to the facing or backing surface followed by the addition of the foamed slurry that will upon drying form the porous core. In an alternative embodiment, a wallboard having a comparatively dense surface layer can be made by application of a comparatively dense skim layer of gypsum/polymer slurry at a point in the process when the foamed core is sufficiently viscous that the skim layer does not significantly mix with the core. Alternatively, a organic binder layer may be applied to the facing or backing paper before the paper is applied to the composite core of the wallboard, also giving the wallboard a comparatively large percentage of organic binder near the surface. In addition, the organic binder used in this surface layer need not be the same organic binder used to bind the inorganic particles together; therefore, the organic binder between the core and the backing paper or the surface of the wallboard can be selected for other properties than merely its ability to bind the inorganic particles in a low density porous core. For example, the organic binder can be a high percentage of elastomeric polymer near backing paper to improve noise attenuation properties of the wallboard product.

For each formulation, a tailored temperature program designed to optimize the final morphology is needed to reproducibly manufacture consistent products. The fine-tuning of the processing conditions (extrusion and calender rates, temperature and pressure profiles, etc.) ultimately depends on the specific thickness of the core material and can be determined by one of ordinary skill in the art without undue experimentation.

It may be advantageous under certain circumstances to produce blown granules and then in a subsequent operation the granules are heated and fused together. This two-stage process allows complicated three-dimensional parts to be manufactured. Granule production gives tight control of composition, pore size, and distribution. Each granule is a miniature foamed part comprising interconnected inorganic fillers bonded by the polymeric network mingled with large amounts of void space. Different granules can be combined before fusing to achieve a mosaic board structure. Potential advantages include enhanced sound cancellation properties without compromising dimensional stability. Prior to fusing, additional polymer adhesives or their precursors may be introduced into the granule mixture to further increase adhesion and bolster acoustical damping.

A more conventional method of board manufacture is composed of the following steps. First, the various ingredients are blended in a mixer. The mixer may be a batch mixer or a continuous mixer such as an extruder and/or an in-line mixer. The fully mixed dispersion is heated and fed through a set of calender rolls to trigger expansion and curing of the polymer. Rehydration and recrystallization of the dehydrated solid fillers also occur with the heating step. The output of the calender is picked up by at least one continuous web of surface layer. Alternatively, two layers of surface material(s) can be used to sandwich the expanded foam The surface layers may be made of paper, fabric, vapor barriers such as polyethylene, polypropylene, Mylar sheets, and reflectors such as aluminum foil. In the case of one-surface-layer configuration, the open surface can be textured with holes, fissures, grooves, or ridges for enhanced sound absorption. In addition to continuous webs of surface layers, the core material can be discharged onto structural elements such as plywood boards to offer shear resistance of the laminated product.

In all of the above configurations, the core material can have added fibrous fillers, such as recycled paper, cotton staples, sheered wool, synthetic polyester or nylon fibers, glass fibers, sugarcane fibers, and mineral wool, for reinforced structural stability. The presence of minor amounts of such fillers does not unduly influence the processability of the core material. Yet, another possibility for performance augmentation is the inclusion of flame retardant materials as part of the inorganic filler package. The list includes alumina trihydrate, antimony oxides, aluminum suffamate, bismuth oxide, tin oxide, ferric oxide, molybedenum oxide, bismuth carbonate, boric acid, sodium borate (borax) and phosphonium salts. Any possibility of increased flammability resulting from the minor presence of organic binders is suppressed entirely by the presence of the added flame retardants.

It is commonly known to those skilled in the art of polymer science and technology that expanded polymers (cellular structures or foams) have been manufactured for decades. Examples include Styrofoam cups and polyurethane cushions. However, to our best knowledge, expanded products featuring inorganic particle networks spaced with large amounts of interconnected or dispersed voids, where the particles are anchored and bridged by a very thin coating of organic binders, have not been developed. Furthermore, the organic network overcoating the fillers exhibit significant acoustic damping properties in this invention. Such viscoelastic damping behavior can be measured by dynamic mechanical analysis (G', G", tangent delta) at the service temperature of the foamed core (e.g., 20° C.) over the frequency range of 20 Hz to 20 KHz. Polymeric systems undergoing viscoelastic relaxations (transitions) under these appropriate conditions are especially beneficial for the intended use. (This means that the subject polymer has a significant measured tangent delta). Optimal systems thus comprise both plastic and rubbery components; either in a pre-polymerized thermoset formulation or pre-assembled into thermoplastic elastomers such as block or graft copolymers. Compositions possessing both hydrophilic and hydrophobic moieties are preferred. They provide both affinity toward the particles (thus strong anchoring) and elastomeric damping characteristics (resulting from microphase-separated domains on the order of 100 nanometers). Numerous formulations and several variants may be developed based on the disclosure here. These shall all fall within the spirit and scope of the present invention.

The core formulations and related fabrication processes can be adapted in a number of ways. When injected into a hollow door (between door panels), a stiffened yet lightweight, fire retardant, sound-absorbing, and thermally insulating, semi-solid door can be made. When overcoated with a dense, scratch resistant topcoat (with or without colorants or pigments), a countertop can be fabricated. The topcoat can be made of highly crosslinked resins such as filled epoxies or melamines.

Below we describe several selected embodiments. Many similar systems can be envisioned and they shall fall within the spirit and scope of this invention.

EXAMPLE 1

Finely ground and calcined gypsum is mixed with water, hydrogenated polybutadiene terminated with hydroxyl groups, low molecular weight polyacrylic acid (less than 250,000), emulsifying agent (WetAid), and cyclohexane, and sodium hypophosphite. Optionally, digested paper fibers from recycled sources may be added to the mixture. The fully mixed slurry is heated in an extruder to 350° F. (transit time approximately 1 minute) and discharged into the feed zone of two parallel calender rollers set at ½" gap. Output from the calender is picked up by two sheets of continuous paper, sandwiching the foamed core.

EXAMPLE 2

To a Portland cement mix is added the following: maleic acid-substituted styrene-butadiene-styrene block copolymer of roughly 50:50 composition (styrene vs. butadiene), ethoxylated trimethalolpropane triacrylate, AIBN (a thermal initiator), methyl ethyl ketone, AOT, water, and sodium bicarbonate. The thoroughly mixed blend is fed through a heating tube under pressure. The outlet is fitted with a multi-orifice nozzle whereby the expanded slurry is broken into small drops (~10–100 microns), which continue to expand and solidify. The foamed granule is further mixed with a hot melt adhesive and injected into a preformed door cavity for reinforcement and sound/heat/cold insulation as well as fire/flame retardancy.

EXAMPLE 3

Calcined gypsum is mixed with antimony oxides in the presence of water. Carboxymethylcellulose and polyacrylic acid (alternatively DMDHEU, dimethyloldihydoxyethyleneurea) are added and the pH is adjusted to the range of 4 to 5. 10% by weight of pre-expanded Expanel is introduced into the system. The mixture is fed from the mixing tank directly to a holding tank whereby a porous felt web picks up a large amount of the slurry per pass. A pad roller setup heats the loaded felt, causing expansion and curing of the slurry. The felt pad is then bonded to paper sheets in a continuous operation.

EXAMPLE 4

This system employs a similar formulation as Example 3, except that the calcined gypsum is first exposed to an aqueous solution of ethylene diamine or PEI (polyethyleneimine). The treated gypsum is next mixed with carboxymethylcellulose and maleic anhydride substituted polybutadiene, (from Ricon). The latter component is solvated in pentane and emulsified by addition of Tween/Span surfactants. Upon drying and curing, the pentane in the mixture volatilizes, creating bubbles throughout the composite, while the carboxyl groups of the polymeric additives form strong bonds with the coated amines, effectively trapping the suspended gypsum particles and creating an interconnecting bridge-like network.

EXAMPLE 5

Calcined gypsum is mixed with water and an organic phase containing urethane precursors, blowing agents and surfactants. The urethane is formed from polyols that are lightly branched having a long chain architecture, and di-isocyanate such as toluene diisocyanate. The blowing agents are chosen from either trichlorofluoromethane or methylene chloride. Vigorous agitation and addition of Tween/Span yield a creamy slurry. Upon mild heating (up to 100° C.), the gypsum rehydrates, depleting the water. Simultaneously, the urethane is blown and adheres strongly to the embedded inorganic particles. The overall composite is that of an open-cell foam, supported by inorganic-organic hybrid bridges and pore walls. The mixture is laid on top of a continuous web of paper on one side during the above heating/curing process, whereas the open face is perforated by an embossed roller to create surface features that optimally absorb audible sound.

EXAMPLE 6

A rubbery latex is created from any of the following elastomeric materials: natural rubber, SBR, nitrile rubber, polychloroprene, chlorosulfonated polyethylene-ethylene-propylene terpolymer, butyl rubber, polyacrylate, or combinations thereof. To the latex is added a decomposable blowing agent such as sodium bicarbonate, 2,2'-azobis-isobutyronitrile, azodicarbonamide, 4,4'-oxybis (benzenesulfonyl hydrazide) and dinitrosopentamethylene-tetramine. This formulation is stabilized with AOT. One part of this mixture is added to two parts of a Plaster of Paris slurry. The final mixture is heated while being poured over a plywood board, and allowed to expand and set into a one-inch layer, which is sandwiched between the plywood underlayer and a topcoat of decorative paper.

What is claimed is:

1. A composition of matter for use in wallboard, comprising:

an organic binder which is polymerized in situ in a crosslinked molecular network during a polymerization reaction, wherein the polymerization reaction comprises at least one polymer forming material that is hydrophobic;

a foaming agent; and a plurality of inorganic particles coated by the organic binder, and wherein the foaming agent forms voids within a network of the coated inorganic particles that are bound together by the organic binder.

2. The composition of matter of claim 1, wherein the foaming agent comprises a surfactant stabilized aqueous solution.

3. A composition of matter for use in wallboard, comprising:

an organic binder which is polymerized in situ in a crosslinked molecular network during a polymerization reaction, wherein the polymerization reaction comprises at least one polymer forming material that is hydrophobic; and a plurality of inorganic particles coated by the organic binder, wherein said polymerization produces an expansion by decomposition of at least one polymer forming material and wherein the at least one polymer forming material that is hydrophobic and the at least one polymer forming material that decomposes need not be the same polymer forming material, and wherein said decomposition evolves a gas phase that forms voids within a network of the coated inorganic particles that are bound together by the organic binder.

4. The composition of matter of claim 3, wherein the organic binder comprises hydrophobic and hydrophilic moieties.

5. The composition of matter of claim 3, wherein the organic binder is polymerized from at least one preexisting polymer.

6. The composition of matter of claim 3, wherein the organic binder is polymerized from at least one monomer.

7. The composition of matter of claim 3, wherein the organic binder comprises at least one polymer selected from the group of polymers consisting of epoxies, polyurethanes, polyesters, polyketones/diamines, and poly(maleic anhydride alt-1-octadecene)/diamenes.

* * * * *